Inventor
William T. Stephens
By Leech & Radue
Attorneys

Aug. 14, 1945.  W. T. STEPHENS  2,382,114
HYDRAULIC COUPLING
Filed Dec. 14, 1942  2 Sheets-Sheet 2

Inventor
William T. Stephens
By Leech & Radue
Attorneys

Patented Aug. 14, 1945

2,382,114

UNITED STATES PATENT OFFICE 2,382,114

HYDRAULIC COUPLING

William T. Stephens, Cleveland, Ohio, assignor to Hydraulic Control Engineering Company, Cleveland, Ohio, a corporation of Ohio Application December 14, 1942, Serial No. 469,015

9 Claims. (Cl. 192—61)

This invention relates to an improved form of hydraulic coupling which may be used to connect a pair of driven and drive shafts in a flexible as well as a positive manner.

It has previously been known to couple a driven shaft and a drive shaft with hydraulic means comprising a rotary member having relatively movable sections arranged to drive an associated gear pump. Also, the use of manually or centrifugally operated valves for controlling the coupling action of the hydraulic fluid through the gear or other pump has been previously known. The hydraulic coupling to be described differs from these prior devices and possesses material advantages thereover because it employs a pressure sensitive check valve means which is dependent only upon the rate of delivery of pressure fluid by the pump means in response to relative rotation of the pump elements associated respectively with the driven and drive shafts. That is to say, the valve means is directly responsive to the pressure fluid delivered by the pump means, and not to a centrifugal force resulting from rotation of the driven shaft.

A specific feature of the present invention is the disposition of the valve means coaxially with the axis of rotation of the coupling in the preferred embodiment, and perpendicular thereto in the modified embodiment, so that in each instance centrifugal force has little or no effect upon the operation of the coupling.

Another object attained by the invention is the provision of a hydraulic coupling having a form of valve means which will permit a small flow of pressure fluid when in closed or partially unseated position in order that the engine or other means connected to the driven shaft may turn over slowly without causing rotation of the drive shaft.

Another feature of the invention exemplified in its preferred embodiment comprises the arrangement of a single valve means to control the flow of pressure fluid from a plurality of pumps driven by the coupled shafts.

Other novel features of improvement contributing to the ease of manufacture of such couplings and smoothness and efficiency in operation will be perceived and readily understood from reading the following detailed description of two illustrative embodiments of the invention in connection with the accompanying drawings, in which Fig. 1 shows a vertical longitudinal section of the preferred form of hydraulic coupling;

Figure 1:
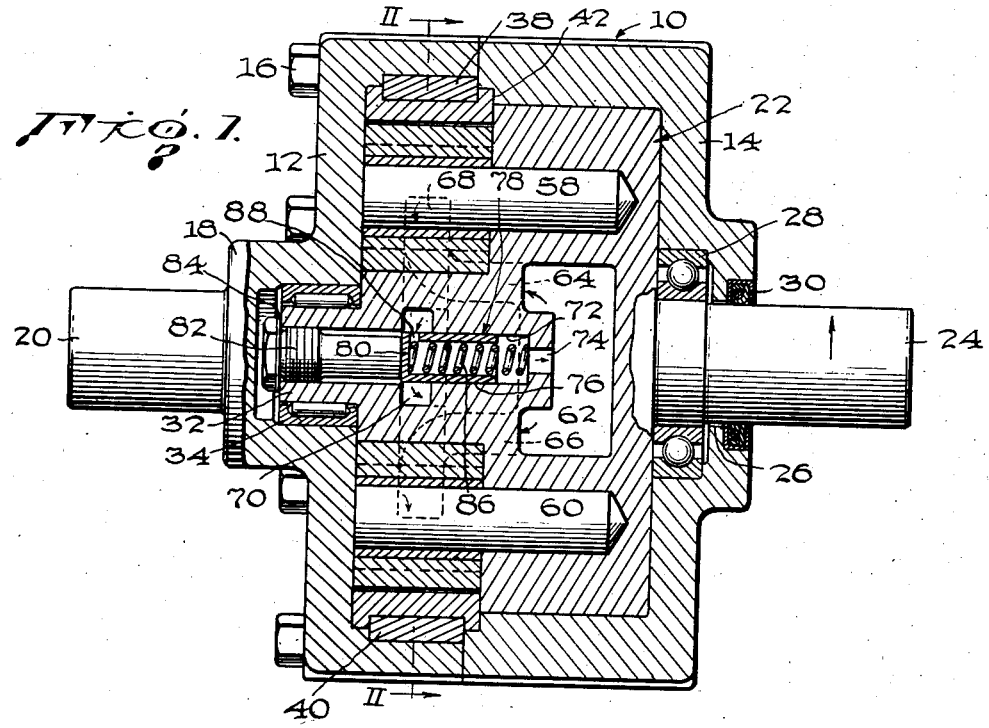
Figure 2:
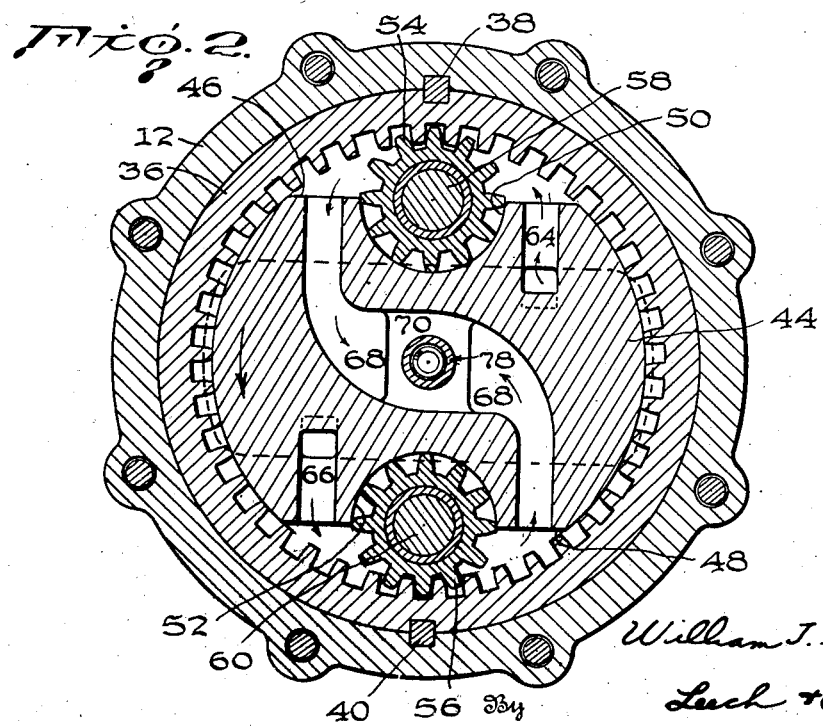
Fig. 2 is a transverse section taken along the line II—II of Fig. 1.

In Figs. 1 and 2 which illustrate a preferred embodiment of the hydraulic coupling of this invention, a sealed coupling housing 10 of cylindrical outline is divided transversely into a housing section 12, and an inter-engaging housing section 14 rigidly united by a plurality of circumferentially spaced cap screws 16, or any other conventional means which may be suitable. It will be seen that housing section 12 has an outwardly extending integral hub portion 18 formed to provide a coupling drive shaft 20 of somewhat smaller diameter.

An internal rotor designated generally as 22 is closely fitted for rotation within the coupling housing 10 and provided with an integral driven shaft 24 extending through an opening 26 in housing section 14 and supported by a conventional bearing 28 mounted within the outer end of the housing section 14. Outwardly of the bearing 28 a shaft seal 30 of common form engages the rotatable driven shaft 24 to prevent the escape of the fluid used for the coupling. At its other end the rotor 22 has a short stub shaft 32 extending within the hollow hub portion 18 of the housing section 12 and journaled within suitable supporting bearings indicated as 34.

As appears best in Fig. 2, the housing section 12 has a ring gear 36 rigidly secured thereto by means such as a key 38 and a similar diametrically opposed key 40. A shouldered joint 42 between the opposed faces of the housing sections 12 and 14 provides means for locking the keys 38 and 40 in position, as will be apparent from a consideration of Fig. 1. Within the ring gear 36 is closely fitted a reduced end 44 of the rotor 22, which end is formed to provide diametrically opposed relieved portions 46 and 48, respectively, having central, semicircular recesses 50 and 52 encompassing the inner halves of pinion gears 54 and 56. Pinion gears 54 and 56 have respective bearing pin supports 58 and 60 in diametrically opposed portions of the reduced part 44 of rotor 22.

The right end of the rotor 22 as viewed in Fig. 1 is cored out to form a symmetrical reservoir recess 62 for supplying oil to the two gear pumps comprised by the pinion gears 54 and 56 and the engaging ring gear 36. Two gear pumps are preferred, but additional ones may be used, particularly for large couplings. The reservoir recess 62 communicates with the pinion gear 54 by means of an L-shape suction passage 64 formed in the rotor 22; and an identical L-shape passage 66 supplies the pinion gear 56 on the opposite side of the coupling. Within the ring gear 36 the left end of the rotor 22 is still further cored to provide a common high pressure main 68 of reverse curve or approximately Z-shape intersecting an annular chamber 70 of a check valve bore 72 which is coaxial with the axis of coupling rotation. The outer ends of the common main 68 terminate at the relieved portions 46 and 48 of the rotor 22 and serve simultaneously to direct high pressure fluid from the delivery side of the pump gears 54 and 56 to the central valve bore 72.

The form and disposition of the check valve bore 72 constitutes one of the important aspects of the invention. It will be observed that this bore 72 has a reduced opening 74 communicating directly and freely with the reservoir recess 62, and also providing an abutment stop for skirt end 76 of a hollow valve plunger 78. At its other end the valve plunger 78 has a solid head 80 for engagement with a stop plug 82 threaded into the short stub shaft 32 of the rotor 22, and having a high pressure fluid sealing gasket 84 on its outer end within the coupling housing 10. A coiled compression spring 86 within the plunger 78 acts yieldingly to maintain the plunger head 80 in abutment with the adjacent end of stop plug 82 so that a lateral restricting port or orifice 88 disposed in the side of the plunger 78 adjacent its head 80 is in communication with the annular chamber 70 receiving high pressure fluid from both gear pumps. In the position illustrated in Fig. 1, and with relative rotation in the direction indicated by the arrow of Fig. 2, pressure fluid from the annular passage chamber 70 will be discharged inwardly through the plunger orifice 88 and longitudinally thereof to escape into the reservoir 62 by way of the bore end opening 74.

In explaining the operation of the single valve form of coupling illustrated in Figs. 1 and 2, it will be assumed that the driven shaft 24 is connected to a gas engine or any other variable speed rotating motive force, and that the coupling drive shaft 20 is connected to the mechanism to be driven, such as a vehicle wheel, for example. For this application of the invention, the orifice 88 of the valve plunger 78 and its seating spring 86 will be so proportioned that at idling speed of the engine, or other driving means, the volume of oil pumped by the two gear pumps will pass through the orifice 88 and bore opening 74 to the reservoir 62 without any appreciable build up of pressure or movement of the valve plunger 78 away from the stop plug 82. By means of this arrangement, the internal rotor 22 is enabled to revolve freely within the housing ring gear 36 to provide a non-rotating or one hundred per cent (100%) slipping drive. As the speed of the engine is increased, the volume of oil pumped will be correspondingly increased, and a high pressure area is built up in the annular chamber 70 and is, in turn, carried back to the high pressure pockets of the pumps adjacent the respective ends of the common high pressure main 68, thus slowing up or retarding the rotation of these pumps. This latter condition exists, however, only because the housing sections 12 and 14 resist rotation due to the load coupled to drive shaft 20. When the inertia of this load is no longer sufficient to counteract the force set up by the oil, housing section 12 and the drive shaft 20 are forced to rotate in the same direction as internal rotor 22 and the driven shaft 24. This concurrent rotation of drive shaft 24 tends to reduce the speed of the two gear pumps, thereby reducing the volume of oil flow and, consequently, its effective pressure. When this occurs, the gear pumps again tend to speed up and the fluid pressure to increase until the positive drive conditions obtain again. Accordingly, a balance will be established between drive shaft 20 and driven shaft 24 so that there will be a fixed relation between their speeds of rotation for a given engine speed.

As the speed of driven shaft 24 is additionally increased, the speed of drive shaft 20 approaches synchronism therewith so that there will eventually be a condition when the two shafts are turning at the same speed. This one-to-one (1:1) ratio is attained when the pressure sensitive valve plunger 78 has been urged far enough to the right of Fig. 1 to close its side port or orifice 88 and establish a hydraulic lock with an attendant direct transmission of motive force from the driven shaft to the drive shaft. It is to be observed in this connection that the fit of the valve plunger 78 in its bore 72 and that of the stop plug 82 will permit pressure fluid to act upon the outside of the plunger head 80 at all times.

If the engine should be slowed down, the drive shaft 20 with its rotating load would momentarily become the coupling driven shaft and shaft 24 would become the driver. Under such conditions, the flow of oil, or other hydraulic fluid, would be reversed as would also the location of the high and low pressure pockets or chambers, passage 68 would become the reservoir, and oil would flow from annular chamber 70 to the two gear pumps and from there be pumped into the space normally constituting reservoir 62. From this latter space it would flow through passage 74, valve bore 72, and orifice port 88 to passage 68. When this reversal occurred, the valve plunger 78 would be urged to the left against the stop plug 82, as there would no longer be a source of high pressure fluid opposing the valve spring 86. Of course, after the drive shaft 20 slowed down to its proper relative speed, normal or driving conditions would again prevail.

Figure 3:
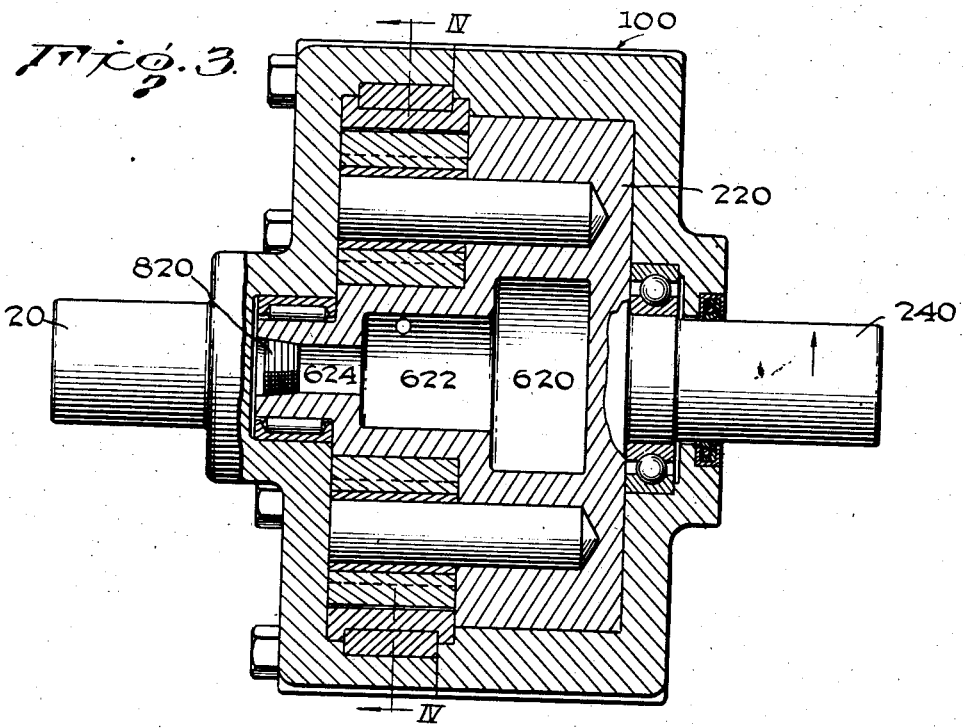
Fig. 3 is a longitudinal vertical section showing a modified form of the hydraulic coupling.
Figure 4:
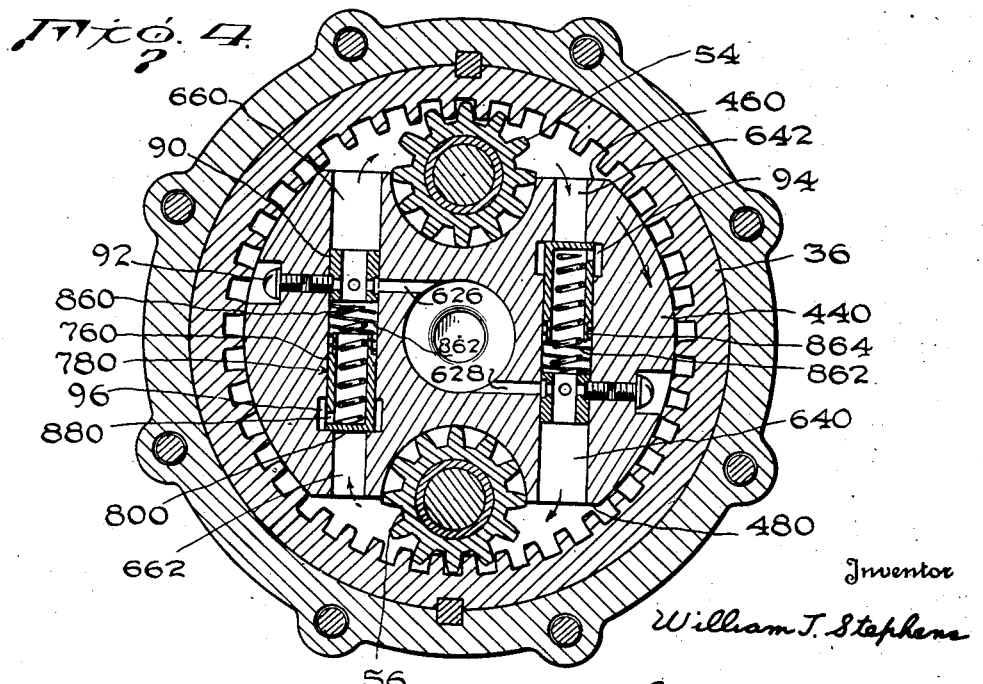
Fig. 4 is a transverse section of the hydraulic coupling of Fig. 3 taken on the line IV—IV.

Except for the details which will be emphasized, the two valve form of hydraulic coupling shown in Figs. 3 and 4 is quite similar to the preferred embodiment which has been described completely.

The internal rotor 220 of the modified coupling is provided with the integral outwardly driven shaft 240 as before, and the other end of the divided coupling housing 100 includes the drive shaft 20. The oppositely disposed pinion gears 54 and 56 are journaled in the internal rotor 220 and cooperate with the ring gear 36 in the same manner as already described to afford a fluid coupling between the driven shaft 240 and the drive shaft 20. The rotor 220 also includes centrally recessed, relieved portions 460 and 480 providing a high pressure and low pressure side for each of the gear pumps.

Instead of a common high pressure passageway, the rotor 220, which is cored to provide a coaxial reservoir 620 and a reduced connecting bore 622, has a pair of parallel, tangential passage ports 626 and 628 leading from the reduced bore 622 of the reservoir to another pair of outwardly disposed and parallel fluid passages 640 and 660. The normal driving relation of this coupling is with the rotor 220 turning as indicated by the arrow in Fig. 4. Accordingly, the parallel fluid passages 640 and 660 which extend between the relieved portions 460 and 480 have high pressure end portions 642 and 662, respectively, extending in the reverse directions shown by Fig. 4. Since the valves in each of the passages 640 and 660 are identical in construction, only one will be described in detail. In passage 660 a side ported stop collar 90 is arranged for communication with the small reservoir port 626 and maintained in that relation by a two-piece set screw assembly 92 countersunk and accessible from the outer periphery of the rotor 220. The skirt 760 of the hollow valve plunger 780 receives a coiled compression spring 860. Each plunger 780, in the position illustrated, has its head 800 abutting a seat formed by the reduced end portion 662 of the passage 660, leaving the lateral restricting port or orifice 880 of the plunger 780 open either to annular recess 94 or 96 of passages 640 and 660 respectively.

It is to be particularly observed that the length of the spring 860 when free from compression is appreciably less than the distance between the stop collar 90 and the proximate end of the valve head 800. Consequently, the valve plungers 780, 780 can be unseated far enough by fluid pressure without compressing the relatively strong spring 860 to permit a flow of pressure fluid from passages 642 and 662, respectively, into the corresponding annular recesses 94 and 96 and the individual restricting ports or orifices 880. To avoid chatter of the valves and even their partial opening before some pressure is built up by the pumps having gears 54 and 56, each valve plunger 780 is provided with a relatively weak spring 862 of such a diameter as to surround the exposed part of the heavy spring 860. One end of the spring 862 is seated on a reduced shouldered portion 864 formed on the outside of the valve skirt 760, and the other end abuts the adjacent end of the stop collar 90, so as to exert a valve-seating force at all times.

With only a single heavy spring action to seat the valves, there is likelihood of a jerky and unsatisfactory action of the coupling. The reason is that a considerable pressure would have to be built up by the pumps before there could be any by-passing of the fluid into annular recesses 94 and 96, and, since no desired starting or load pick up slippage can occur in the coupling until there is such by-passing, the coupling would start in a positive drive relation. Then additional load imposed on the drive shaft 20 would create more hydraulic pressure which in turn would unseat the valve plungers 780 and produce slippage. The immediate drop in pressure upon unseating of the valve plungers 780 would permit the heavy springs to return the plungers 780 to their seats, resulting in jerky action by repetition of the cycle.

For example, a lightly loaded automotive truck of large load capacity and having correspondingly heavy valve springs would tend to move immediately as soon as the engine was started, but increase in load, as when the truck reached a hill, would increase the holding pressure required and result in the erratic action which has been described.

In addition to the functional characteristics which will be described in connection with its operation, the rotor 220 of the modified form of hydraulic coupling offers some advantages by way of simple machining of its internal passages. The reservoir portions 620 and 622 which are coaxial with the driven shaft 240 have a still smaller filling passage 624 closed by a screw plug 820. It is a simple matter to drill the tangential passage ports 626 and 628 because of their direct alignment with the opening for the set screw means 92. For the same reasons, the drilling of the straight and parallel fluid passages 640 and 660, which extend completely through the rotor 220 on opposite sides of its axis of rotation, is a simple matter, as is also the assembly of the ported stop collars 90 and valve plungers 780 therein.

With the direction of relative rotation shown in Fig. 4, the gear pump having pinion gear 54 will deliver high pressure fluid to the smaller end 642 of fluid passage 640 and the other gear pump having pinion gear 56, will supply high pressure fluid to the adjacent end portion 662 of the fluid passage 660. The low pressure sides of these two gear pumps will receive a supply of oil or other hydraulic fluid from the rotor reservoir 620 through the respective passages 626 and 628 in open communication with the collar 90 of each valve, at such times as fluid is not available from the high pressure side of the other pump.

When the coupling drive shaft 20 exceeds the speed of the driven shaft 240, as would occur if the driving engine were decelerated quickly after the coupling had been turning at high speed, the two gear pumps would supply pressure fluid in a reverse direction to the parallel fluid passages 640 and 660 whence it would return to the reservoir 620 by way of the ported stop collars 90. Since the reversed flow of oil allows valve heads 800 to return to their seats, thus preventing any flow of oil through passages 642 and 662 to the low pressure sides of the pumps, the opposed flow of high pressure oil from the two pumps builds up a pressure in reservoirs 620 and 622, passages 640 and 660 and relieved portions 460 and 480 which tends to lock gears 54 and 56 in positive relation with ring gear 36, thus resulting in both drive and driven portion of the coupling revolving in synchronous relation with one another. This action produces a braking effect due to the resistance set up by the motive force or engine resisting rotation. When the speed of the entire unit has slowed down to the point where the load no longer reacts to drive the engine, normal operation is again restored. Operation of this nature is used to great advantage in the case of an automotive type vehicle going down hill and using the engine as a partial brake in holding back the load. This same action also takes place when a vehicle of the automotive type is stalled on a hill for then the action of the load would tend to turn the pumps in the reverse direction and produce the same results.

While the reverse locking action as explained has been limited to the two valve coupling of Figs. 3 and 4, and the retarding action to the one valve coupling of Figs. 1 and 2, either action may be obtained in each of these two forms of couplings, by suitable coring and machining of the passages for the hydraulic fluid.

It is to be particularly noted that the valve plungers in both embodiments of the invention are arranged for movement in a direction which is perpendicular to the centrifugal force of coupling rotation.

Since other applications of the principles of the invention set forth herein will be apparent to those skilled in this art, it is not intended that the invention should be limited to any specific details of construction or arrangement of parts except as may be required by the scope of the appended claims.

Having thus described my invention, what I claim as new and desire to secure by Letters Patent of the United States is:

1. A hydraulic coupling of the character described, comprising a sealed housing adapted to rotate with a shaft, a closely fitted rotor disposed within said housing and adapted to rotate with another shaft, a ring gear secured within the said housing, pinion gears rotatably supported by said rotor at circumferentially spaced positions and arranged to mesh with said ring gear so as to produce a gear pump action as the rotor turns with respect to the housing, said rotor being formed to provide fluid suction and delivery passages respectively leading to and from each pump pinion gear, and pressure sensitive valve means carried by the rotor and arranged between the delivery passages and the suction passages, said valve being constructed to unaidedly reduce the flow therethrough as the relative pressure difference between said passages increases, said valve means being directly formed to permit restricted flow of the pressure fluid at idling or slow relative housing and rotor speeds.

2. A hydraulic coupling of the character described, comprising a sealed housing adapted to rotate with a driven shaft, a closely fitted rotor disposed within said housing and adapted to rotate a driving shaft, a ring gear within the said housing, pinion gears rotatably supported by said rotor at equally spaced positions and arranged to mesh with said ring gear so as to produce gear pump actions as the rotor turns with respect to the housing, said rotor being formed to provide a symmetrical fluid reservoir having suction and delivery passages leading to opposite sides of each pump pinion gear, and directly responsive pressure closable valve means carried by the rotor and constructed and arranged to move in a direction perpendicular to the centrifugal force of coupling rotation, the pressure responsive portion of the valve means being exposed to the fluid pressure directly from the pumps and the said means being constructed to control the flow of pressure fluid from the delivery side of the pinion gears to the fluid reservoir of the rotor, said valve means being formed to permit open but restricted flow of the pressure fluid to the reservoir at idling or slow driving speed.

3. A hydraulic coupling of the character described, comprising a sealed housing adapted to rotate with a driven shaft, a closely fitted rotor disposed within said housing and adapted to rotate with a driving shaft, a ring gear within the said housing, a plurality of pinion gears rotatably supported by said rotor at equally spaced positions and arranged to mesh with said ring gear so as to produce a gear pump action as the rotor turns with respect to the housing, said rotor being formed to provide a fluid reservoir having respective suction and common delivery passages leading to each pump pinion gear, and a pressure sensitive valve means mounted coaxially in the rotor and arranged to control the flow of pressure fluid from the delivery side of the pump pinion gears to the fluid reservoir of the rotor, said valve means including a hollow plunger having an orifice therethrough to permit restricted flow of the pressure fluid to the reservoir at idling or slow driving speed, said orifice being so restricted that it will not accommodate the discharge of the pumps above idling speed whereby the valve is fully closed solely by pressure.

4. A hydraulic coupling of the character described, comprising a sealed housing adapted to rotate with a driven shaft, a closely fitted rotor disposed within said housing and adapted to rotate with a driving shaft, a ring gear secured within the said housing, a plurality of pinion gears rotatable supported by said rotor at equally spaced positions and arranged to mesh with said ring gear so as to produce a gear pump action as the rotor turns with respect to the housing, said rotor being formed to provide a fluid reservoir having respective suction and common delivery passages leading to each pump pinion gear, and a pressure sensitive check valve means carried coaxially by the rotor transversely of the common delivery passage, which delivery passage is formed to provide an annular chamber around a portion of the check valve and arranged to control the flow of pressure fluid from the delivery side of the pump pinion gears to the fluid reservoir of the rotor, said check valve means including a hollow plunger having an orifice laterally therethrough adjacent said annular chamber to permit restricted flow of the pressure fluid to the reservoir at idling or slow driving speed and to block flow of the pressure fluid to the reservoir when the hollow plunger moves out of the annular chamber in response to a predetermined increase in driving speed.

5. A hydraulic coupling of the character described, comprising a sealed housing adapted to rotate with a driven shaft, a closely fitted rotor disposed within said housing and adapted to rotate with a driving shaft, a ring gear secured within the said housing, an oppositely disposed pair of pinion gears rotatably supported by said rotor and arranged to mesh with said ring gear so as to produce a gear pump action as the rotor turns with respect to the housing, said rotor being formed to provide a fluid reservoir having ducts leading to each pump pinion gear, said ducts each including one of two parallel passages extending through the rotor in a direction perpendicular to the axis of said rotor and on opposite sides thereof so that each of said parallel passages will receive high pressure fluid from one of the gear pumps and supply low pressure fluid to the other of said gear pumps, and a pressure sensitive check valve means carried by the rotor and arranged in each of the parallel passages to control the flow of pressure fluid from the delivery side of the respective pinion gears, said check valve means being formed to reciprocate in the parallel passages and permit restricted flow of the pressure fluid at idling or slow driving speed.

6. A hydraulic coupling of the character described, comprising a sealed housing adapted to rotate with a shaft, a closely fitted rotor disposed within said housing and adapted to rotate with another shaft, a ring gear within the said housing, an oppositely disposed pair of pinion gears rotatably supported by said rotor and arranged to mesh with said ring gear so as to produce a gear pump action as the rotor turns with respect to the housing, said rotor being formed to provide pressure and suction chambers for each pump pinion gear, two parallel passages extending through the rotor in a direction perpendicular to the axis of said rotor and on opposite sides thereof so that each of said parallel passages will receive high pressure fluid from one of the gear pumps pressure chambers and supply low pressure fluid to the other of said gear pumps suction chambers, and a pressure sensitive valve means arranged in each of the parallel passages to control the discharge of pressure fluid from the delivery side of the respective pinion gears, said check valve means each including a plunger reciprocable in one of the parallel passages and having a lateral orifice connected with a bore therethrough, and said parallel passages each being provided with an annular chamber extending around the orifice of its valve plunger for delivering restricted flow of the pressure fluid when the valve plunger is unseated at idling speed, said lateral port being positioned to move out of the chamber and to block flow of the pressure fluid when the valve plunger moves sufficiently in response to an increase in speed.

7. A hydraulic coupling of the character described, comprising a sealed housing adapted to rotate with a shaft, a closely fitted rotor disposed within said housing and adapted to rotate with another shaft, a ring gear within the said housing, an oppositely disposed pair of pinion gears rotatably supported by said rotor and meshing with said ring gear so as to produce a gear pump action as the rotor turns with respect to the housing, said rotor being formed to provide a fluid reservoir and also having suction and delivery passages leading to each pump pinion gear, said suction and delivery passages including two parallel passages extending through the rotor in a direction perpendicular to the axis of said rotor and on opposite sides thereof so that each of said parallel passages will receive high pressure fluid from one of the gear pumps and supply low pressure fluid to the other of said gear pumps, and a pressure sensitive check valve means and arranged in each of the parallel passages to control the flow of pressure fluid from the delivery side of the respective pinion gears, said check valve means each including a hollow plunger reciprocable in and closing one of the parallel passages and having a lateral orifice therethrough, a light spring for constantly urging the hollow plunger into seated position and a strong spring for increasing resistance to movement after the hollow plunger has been unseated, and said parallel passages each being provided with a short annular chamber extending around the orifice of its valve plunger for delivering restricted flow of the pressure fluid when the valve plunger is unseated at idling speed, and to block flow of the pressure fluid when the valve plunger moves out of the annular chamber in response to pressure resulting from an increase in speed of the housing and rotor.

8. An automatic hydraulic coupling of the character described, comprising a sealed housing adapted for rotation with a shaft, a closely fitted rotor disposed within said housing and adapted to rotate with another shaft, internal ring gear teeth fixed in said housing, a pair of pinion gears rotatably supported by said rotor at diametrically spaced positions and meshing with said ring gear teeth so as to form two gear pumps effective as the rotor turns with respect to the housing, said rotor being formed to provide merged suction and merged delivery passages for said pumps and an axially disposed common passage connecting the merged passages, a pressure sensitive valve means slidably arranged in the common passage, which common passage is formed to provide an annular chamber around a portion of the valve and arranged to control the flow of pressure fluid from the delivery side of the two pumps, said valve including a hollow plunger having an orifice laterally therethrough exposed in said annular chamber to permit restricted flow of the pressure fluid at idling or slow driving speed and to block flow of the pressure fluid to the reservoir when the plunger orifice is moved out of the annular chamber in response to a predetermined increase in driving speed.

9. An automatic hydraulic coupling of the character described, comprising a sealed housing adapted for rotation with a shaft, a closely fitted rotor disposed within said housing and adapted to rotate with another shaft, internal ring gear teeth fixed in said housing, a pair of pinion gears rotatably supported by said rotor at diametrically spaced positions and meshing with said ring gear teeth so as to form two gear pumps effective as the rotor turns with respect to the housing, said rotor being formed to provide merged suction and merged delivery passages for said pumps and an axially disposed common passage connecting the merged passages, a pressure sensitive valve means slidably arranged in the common passage, which common passage is formed to provide an annular chamber around a portion of the valve and arranged to control the flow of pressure fluid from the delivery side of the two pumps, said valve including a hollow plunger having an orifice laterally therethrough exposed in said annular chamber to permit restricted flow of the pressure fluid at idling or slow driving speed and to block flow of the pressure fluid to the reservoir when the plunger orifice is moved out of the annular chamber in response to a predetermined increase in driving speed, said common passage being enlarged into a reservoir positioned on the suction side of said valve.

WILLIAM T. STEPHENS.